Patented May 4, 1937

2,079,068

UNITED STATES PATENT OFFICE 2,079,068

PROCESS FOR THE PRODUCTION OF VINYL FORMATE

Willy O. Herrmann, Munich, Germany, assignor to Chemische Forschungsgesellschaft m. b. H., Bavaria, Germany, a corporation No Drawing. Application August 27, 1934, Serial No. 741,733. In Germany September 1, 1933

18 Claims. (Cl. 260—106)

A process for the manufacture of vinyl formate is not known hitherto. There are disclosures by Klatte in his U. S. P. 1,084,581 according to which vinyl formate is formed in small quantities when leading acetylene through a mixture of acetic acid and formic acid in the presence of mercury phosphate. The production of pure vinyl formate according to Klatte is difficult and of no industrial interest; besides the rectified product contains as impurities sulphur and phosphorous compounds according to its origin.

This invention relates to a method for producing vinyl formate upon any industrial scale desired and of desired purity and besides results in a very good output. This process consists in causing formic acid to react upon vinyl ester containing more than one carbon atom in its acid radical and to distill off the vinyl formate formed. It is useful to carry out this reaction in the presence of catalysts especially in the presence of mercury salts. If using mercury salts it may be advantageous not to use them in the prepared state but to generate them in the reaction liquid itself. Generally it will be of advantage to use the acid in a certain excess.

The following examples illustrate the carrying out of my invention but it is to be understood that I do not limit myself to the details in these examples or the methods mentioned.

Example I 129 grams of vinyl acetate are mixed with 69 grams of formic acid and 1 gram of mercuric oxide is added. Then 10 cc. of 84 percentage phosphoric acid are poured in. The mixture is heated in a flask with a fractionating column. Whilst heating a high percentage vinyl formate is distilled off and obtained in a good yield. The vinyl formate thus obtained is free from sulphuric and phosphoric compounds and may be easily rectified to a product of high purity.

Example II

To a mixture of 129 grams of vinyl acetate and 69 grams of formic acid 1 gram of mercuric oxide and 0.5 cc. concentrated sulphuric acid are added. The process of heating and distilling off is carried out as described in the foregoing example and a high percentage of vinyl formate is obtained.

Example III

To a mixture of 342 grams of vinyl butyrate and 138 grams of formic acid 2 grams of mercuric acetate and then 0.2 gram of sulphuric acid are added. The process of heating and distilling off is carried out according to Example I. A high percentage of vinyl formate is obtained which can be further rectified if desired.

When using vinyl esters of higher molecular carboxylic acid groups such as e. g. vinyl laurate, vinyl palmitate or vinyl stearate the distilling off of the vinyl formate formed becomes easier.

The vinyl formate now obtainable according to this invention upon any industrial scale and of any purity desired is the initial material for numerous reactions. An application of considerable importance is to polymerize according to the peculiar polymerization process and to the polymerization products which as an initial member of the homologous series show peculiarly advantageous qualities. They may also be polymerized together with other products such as organic vinyl ester, vinyl chloride, styrene, acrylic ester and the like. They may be used by themselves or in a mixture with other polymerization products such as polymerized vinyl chloride, polyacrylic ester, polystryrene or the like—polymerized together or not—as materials for lacquers, impregnating means, plastic masses, sticking means, filling materials, binding means for stratified products especially as binders or sticking means for non-splintering glass, moulded articles of all kinds especially material for gramophone records, substitution products for caoutchouc, insulating materials, films, artificial threads, coating materials for walls and floors and the like.

While I have specifically described the preferred embodiment of my invention, it is to be understood that the invention is not to be limited to all the details hereinbefore described, but may be otherwise varied within the scope of the following claims.

What I claim is:

1. Process for producing vinyl formate by heating a vinyl ester containing more than one carbon atom in its acid radical together with formic acid and distilling off the formed vinyl formate.

2. Process for producing vinyl formate by heating a vinyl ester containing more than one carbon atom in its acid radical together with formic acid and a catalyst and distilling off the formed vinyl formate.

3. Process for producing vinyl formate by heating a vinyl ester containing more than one carbon atom in its acid radical together with formic acid and a mercury compound and distilling off the formed vinyl formate.

4. Process for producing vinyl formate by heating a vinyl ester containing more than one carbon atom in its acid radical together with formic acid and a mercury salt produced in the reaction medium and distilling off the formed vinyl formate.

5. Process for producing vinyl formate by heating a vinyl ester containing more than one carbon atom in its acid radical together with formic acid, a mineral acid mercury salt and an excess of mineral acid and distilling off the formed vinyl formate.

6. Process for producing vinyl formate by heating a vinyl ester containing more than one carbon atom in its acid radical together with formic acid, a mineral acid mercury salt produced in the reaction liquid and an excess of mineral acid and distilling off the formed vinyl formate.

7. Process for producing vinyl formate by heating a vinyl ester containing more than one carbon atom in its acid radical together with formic acid, an agent preventing oxidation and a catalyst and distilling off the formed vinyl formate.

8. Process for producing vinyl formate by heating a vinyl ester containing more than one carbon atom in its acid radical together with formic acid, an agent preventing oxidation and a mercury compound and distilling off the formed vinyl formate.

9. Process for producing vinyl formate by heating a vinyl ester containing more than one carbon atom in its acid radical together with formic acid, an agent preventing oxidation, a mineral acid mercury salt and an excess of mineral acid and distilling off the formed vinyl formate.

10. Process for producing vinyl formate by heating a vinyl ester containing more than one carbon atom in its acid radical together with formic acid, an agent preventing oxidation, a mineral acid mercury salt produced in the reaction liquid and an excess of mineral acid and distilling off the formed vinyl formate.

11. Process for producing vinyl formate by heating vinyl acetate together with formic acid and a catalyst and distilling off the formed vinyl formate.

12. Process for producing vinyl formate by heating vinyl acetate together with formic acid and a mercury compound and distilling off the formed vinyl formate.

13. Process for producing vinyl formate by heating vinyl acetate together with formic acid, a mineral acid mercury salt produced in the reaction liquid and an excess of mineral acid and distilling off the formed vinyl formate.

14. Process for producing vinyl formate by heating vinyl acetate together with formic acid, an agent preventing oxidation, a mineral acid mercury salt produced in the reaction liquid and an excess of mineral acid and distilling off the formed vinyl formate.

15. Process for producing vinyl formate by heating vinyl butyrate together with formic acid and a catalyst and distilling off the formed vinyl formate.

16. Process for producing vinyl formate by heating vinyl butyrate together with formic acid, a mercury salt produced in the reaction medium and distilling off the formed vinyl formate.

17. Process for producing vinyl formate by heating vinyl butyrate together with formic acid, a mineral acid mercury salt produced in the reaction liquid and an excess of mineral acid and distilling off the formed vinyl formate.

18. Process for producing vinyl formate by heating vinyl butyrate together with formic acid, an agent preventing oxidation, a mineral acid mercury salt produced in the reaction liquid and an excess of mineral acid and distilling off the formed vinyl formate.

WILLY O. HERRMANN.